United States Patent
Hsu et al.

(10) Patent No.: US 9,467,813 B2
(45) Date of Patent: Oct. 11, 2016

(54) WIRELESS NETWORK SYSTEM AND BASE STATION CONNECTING METHOD THEREOF

(71) Applicant: Institute For Information Industry, Taipei (TW)

(72) Inventors: Chun-Yen Hsu, Taipei (TW);
Feng-Ming Yang, Taipei (TW);
Chia-Hung Wei, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/592,612

(22) Filed: Jan. 8, 2015

(65) Prior Publication Data

US 2015/0195680 A1   Jul. 9, 2015

Related U.S. Application Data

(60) Provisional application No. 61/925,205, filed on Jan. 8, 2014.

(51) Int. Cl.
| | |
|---|---|
| *H04W 4/02* | (2009.01) |
| *H04W 64/00* | (2009.01) |
| *H04W 76/02* | (2009.01) |
| *H04W 36/32* | (2009.01) |
| *H04W 48/04* | (2009.01) |
| *H04W 84/04* | (2009.01) |

(52) U.S. Cl.
CPC ............. *H04W 4/027* (2013.01); *H04W 36/32* (2013.01); *H04W 64/006* (2013.01); *H04W 76/02* (2013.01); *H04W 48/04* (2013.01); *H04W 84/045* (2013.01)

(58) Field of Classification Search
CPC . H04W 4/027; H04W 64/006; H04W 76/02; H04W 48/04
See application file for complete search history.

(56) References Cited

U.S. PATENT DOCUMENTS

| | | | | |
|---|---|---|---|---|
| 2010/0298001 | A1* | 11/2010 | Dimou | H04L 67/02 455/441 |
| 2011/0076938 | A1* | 3/2011 | Eguchi | H04L 1/1825 455/7 |
| 2011/0263274 | A1* | 10/2011 | Fox | H04W 36/14 455/456.2 |
| 2012/0058763 | A1* | 3/2012 | Zhao | H04W 48/20 455/434 |
| 2014/0057634 | A1* | 2/2014 | Chang | H04W 36/32 455/437 |
| 2014/0141785 | A1* | 5/2014 | Wang | H04W 36/32 455/441 |
| 2015/0172967 | A1* | 6/2015 | Senoo | H04W 36/0061 455/436 |

* cited by examiner

*Primary Examiner* — Kenneth Lam
(74) *Attorney, Agent, or Firm* — Skaar Ulbrich Macari, P.A.

(57) ABSTRACT

A wireless network system and a base station connecting method thereof are provided. The wireless network system includes a mobile apparatus and a first base station. The mobile apparatus calculates a moving speed of the mobile station. The first base station broadcasts speed threshold information of the first base station. The mobile apparatus receives the speed threshold information from the first base station, and connects with the first base station after determining that the moving speed conforms to the speed threshold information.

12 Claims, 5 Drawing Sheets

WIRELESS NETWORK SYSTEM AND BASE STATION CONNECTING METHOD THEREOF

PRIORITY

This application claims priority to U.S. Provisional Patent Application No. 61/925,205 filed on Jan. 8, 2014, which is hereby incorporated herein by reference in its entirety.

FIELD

The present invention relates to a wireless network system and a base station connecting method thereof; and more particularly, the wireless network system and the base station connecting method thereof according to the present invention decides whether to create a connection according to a speed of a mobile apparatus.

BACKGROUND

In the conventional wireless network architecture, primarily allocation of the network resources is dominated by a macrocell base station and a plurality of distributed small cell base stations are used to create connections for user equipments (UEs). Specifically, the macrocell base station usually has a high computational capability and wide communication coverage. However, as the number of UEs in the communication coverage of the macrocell base station increases, relying on a single macrocell base station to manage all connections of the UEs tends to cause degradation in utilization efficiency of the whole network. Therefore, the small cell base stations are deployed to ease the working load of the macrocell base station.

In detail, although the small cell base stations have a low computational capability and small communication coverage, they can be deployed at a low cost. Therefore, a large amount of small cell base stations can be deployed in densely populated areas to create connections for UEs. This can ease the burden of the macrocell base station to improve the utilization efficiency of the whole network.

However, the communication coverage of the small cell base stations is relatively small in the prior art, so a UE that moves at a relatively high speed in the network will experience frequent handovers as it passes through a plurality of small cell base stations within a short time. This will cause a burden in the network connection processing.

Furthermore, when a UE is moving at a high speed, the UE has to measure the signal strength of different small cell base stations and report the measurement results and the UE movement information to the base stations to determine whether a network connection can be made. However, in doing so, the UE has to consume too many resources in measuring the signal strength of and reporting to inappropriate base stations, and the base stations have to additionally predict the movement route of the UE according to the movement information of the UE, which leads to a significant decrease in the utilization efficiency of the network.

As described above, the conventional wireless network architecture cannot stably maintain connections of UEs having different moving velocities yet. Accordingly, an urgent need exists in the art to provide a solution capable of efficiently and normally creating connections for UEs having different moving velocities in a heterogeneous wireless network to make an improvement on the shortcomings of the prior art.

SUMMARY

A primary objective of the present invention includes providing a base station connecting method for a wireless network system. The wireless network system comprises a mobile apparatus and a first base station. The base station connecting method comprises the following steps of: (a) enabling the mobile apparatus to calculate a moving speed of the mobile apparatus; (b) enabling the first base station to broadcast speed threshold information of the first base station, wherein the speed threshold information comprises a speed threshold upper limit value; (c) enabling the mobile apparatus to receive the speed threshold information from the first base station; (d) enabling the mobile apparatus to determine that the moving speed is lower than the speed threshold upper limit value; and (e) enabling the mobile apparatus to connect with the first base station according to the result of the step (d).

To achieve the aforesaid objective, certain embodiments of the present invention include a wireless network system, which comprises a mobile apparatus and a first base station. The mobile apparatus calculates a moving speed of the mobile apparatus. The first base station broadcasts speed threshold information of the first base station. The speed threshold information comprises a speed threshold upper limit value. The mobile apparatus receives the speed threshold information from the first base station, and connects with the first base station after determining that the moving speed is lower than the speed threshold upper limit value.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention.

It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
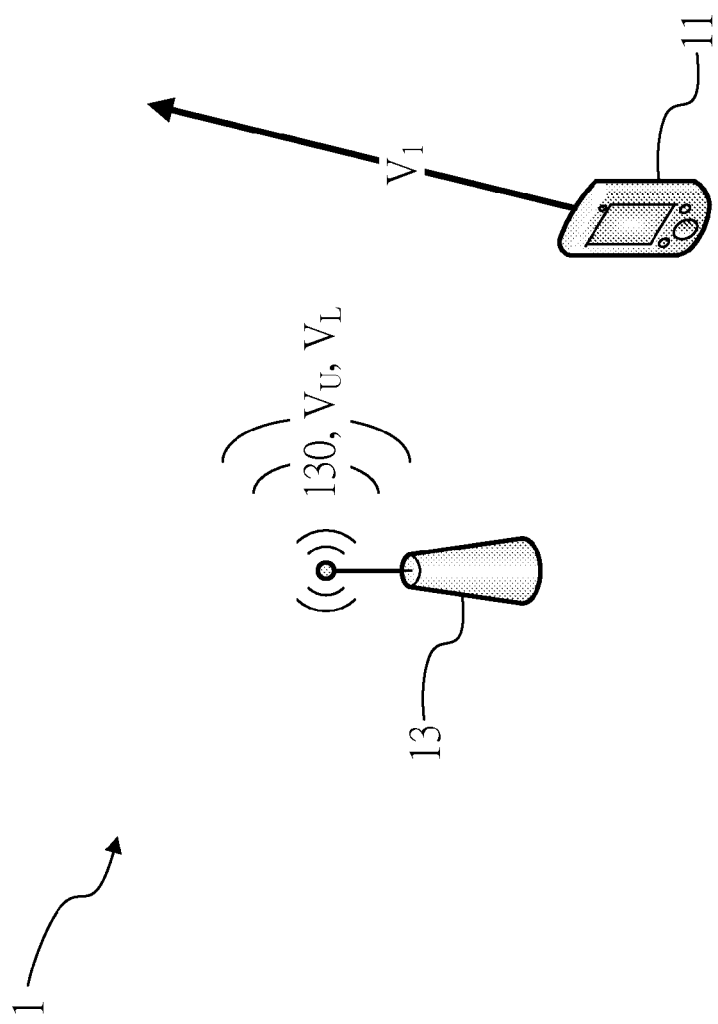
FIG. 1A is a schematic view of a wireless network system according to a first embodiment of the present invention.
Figure 1B:
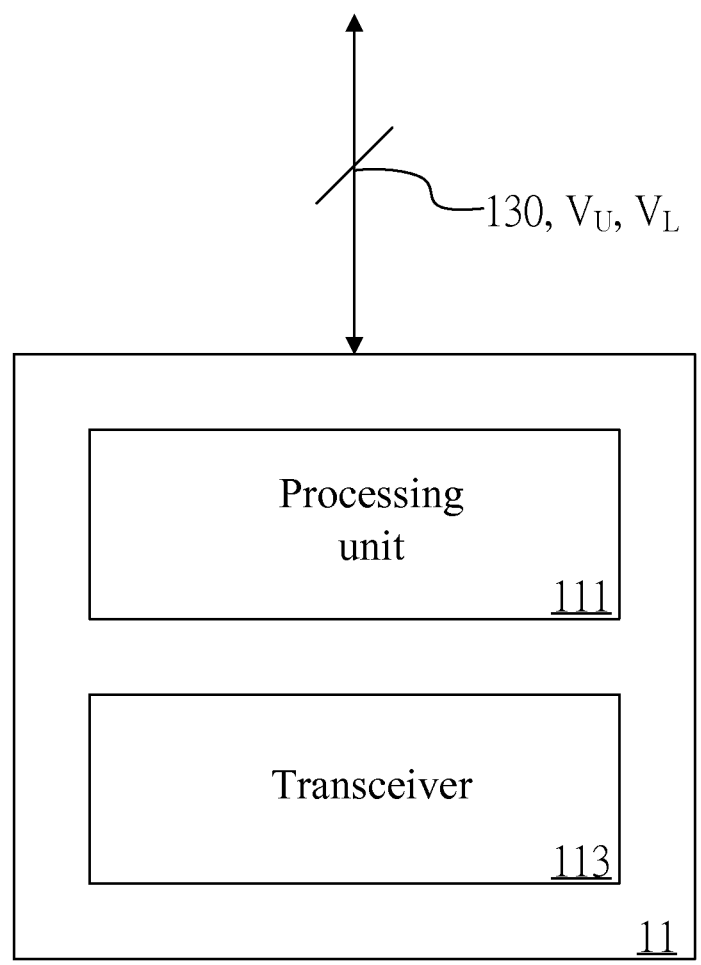
FIG. 1B is a block diagram of a mobile apparatus according to the first embodiment of the present invention.

Please refer to FIGS. 1A~1B together. FIG. 1A is a schematic view of a wireless network system 1 according to a first embodiment of the present invention, and the wireless network system 1 comprises a mobile apparatus 11 and a first base station 13. FIG. 1B is a block diagram of the mobile apparatus 11 according to the first embodiment of the present invention, and the mobile apparatus 11 comprises a processing unit 111 and a transceiver 113. The connecting process of the base station of the present invention will be further illustrated hereinafter.

Firstly, the processing unit 111 of the mobile apparatus 11 firstly calculates a moving speed $V_1$ of the mobile apparatus 11 itself. Then, the transceiver 113 of the mobile apparatus 11 receives speed threshold information 130 broadcasted by the first base station 13 when the mobile apparatus 11 moves to approach the first base station 13. The speed threshold information 130 comprises a speed threshold upper limit value $V_U$, which presents a speed upper limit of the mobile apparatus that can be served by the first base station 13.

Afterwards, the processing unit 111 of the mobile apparatus 11 may determine whether the moving speed $V_1$ thereof exceeds the speed threshold upper limit value $V_U$ required by the first base station 13. If the determination result is "no", it means that the moving speed $V_1$ of the mobile apparatus 11 is within the range that can be stably served by the first base station 13, and then the mobile apparatus 11 connects with the first base station 13 via the transceiver 113.

Otherwise, if the moving speed $V_1$ of the mobile apparatus 11 exceeds the speed threshold upper limit value $V_U$ required by the first base station 13, it means that the moving speed $V_1$ of the mobile apparatus 11 is beyond the range that can be stably served by the first base station 13, and then the mobile apparatus 11 doesn't connect with the first base station 13 so as to avoid the subsequent unstable connection and decrease the times of handovers.

It should be particularly appreciated that, in other implementations, the speed threshold information 130 may further comprise a speed threshold lower limit value $V_L$, which represents a speed lower limit of the mobile apparatus that can be served by the first base station 13; and the processing unit 111 of the mobile apparatus 11 can simultaneously determine whether the moving speed $V_1$ is between the speed threshold lower limit value $V_L$ and the speed threshold upper limit value $V_U$ so as to subsequently determine whether to connect with the first base station 13. However, this is not intended to limit implementations of the speed thresholds; and people skilled in the art shall readily understand through the aforesaid disclosures of the present invention that, the speed threshold information is used to specify the acceptable speed range of the base station.

Figure 2:
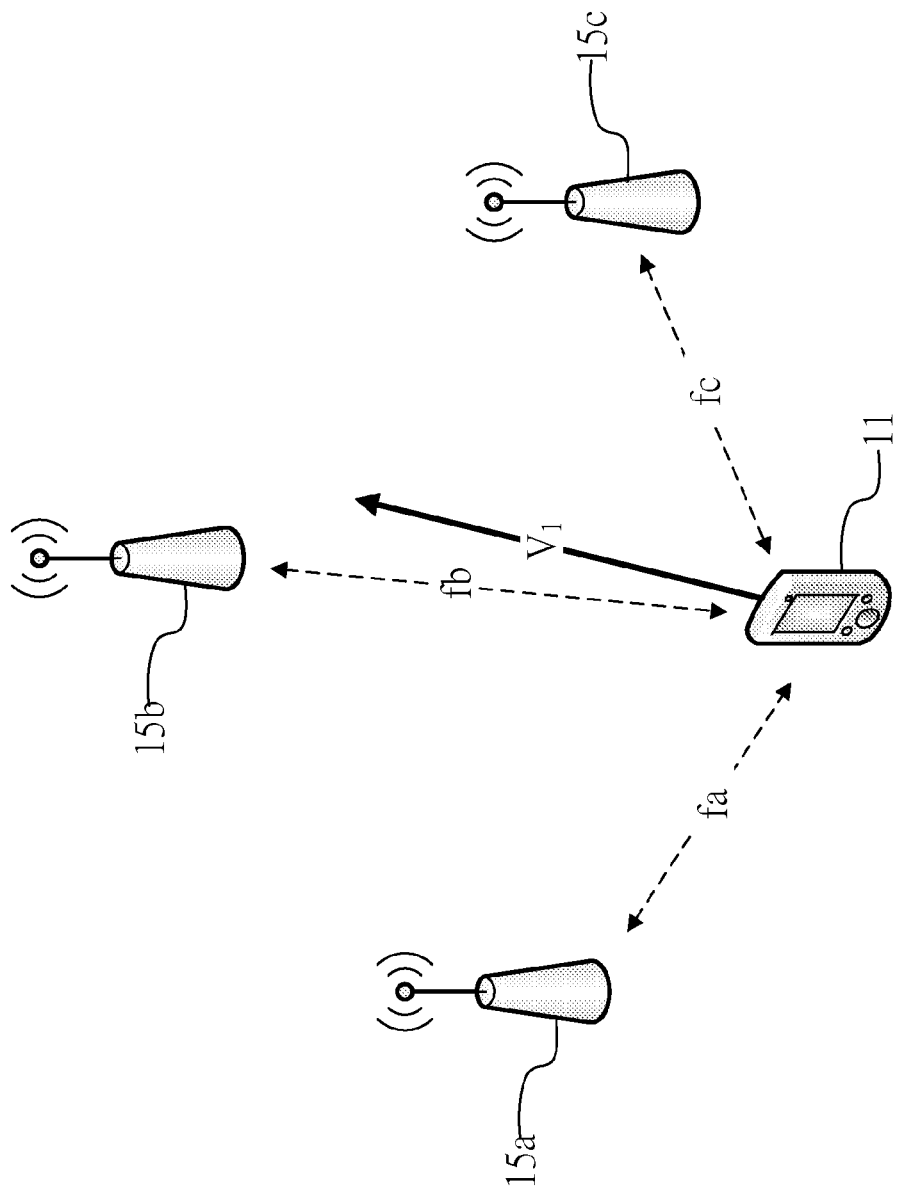
FIG. 2 is a schematic view illustrating how a mobile apparatus calculates a speed according to a second embodiment of the present invention.

Please refer to FIG. 2, which is a schematic view illustrating how the mobile apparatus 11 calculates a speed according to a second embodiment of the present invention. It shall be particularly appreciated that, the architecture of the second embodiment is the same as that of the previous embodiment, so the components with the same reference numerals also have the same functions and, thus, will not be further described herein. However, the second embodiment is mainly intended to illustrate how the mobile apparatus 11 accomplishes estimation of the speed via a plurality of base stations.

Firstly, the transceiver 113 of the mobile apparatus 11 receives a plurality of frequency values $f_a$, $f_b$, $f_c$ relative to a baseline frequency value (not depicted) from a plurality of second base stations 15a, 15b, 15c. The baseline frequency value is a frequency uniformly and regularly used in the wireless network environment, and the frequency values $f_a$, $f_b$, $f_c$ are the frequency information actually received by the mobile apparatus 11 from the second base stations 15a, 15b, 15c.

Then, the processing unit 111 of the mobile apparatus 11 calculates a reference frequency value $F_{ref}$ of the frequency values $f_a$, $f_b$, $f_c$, and further calculates a plurality of frequency shift values $SHIFT_a$, $SHIFT_b$, $SHIFT_c$ of the frequency values $f_a$, $f_b$, $f_c$ relative to the reference frequency value $F_{ref}$.

Afterwards, the processing unit 111 of the mobile apparatus 11 selects a most appropriate frequency shift value from the frequency shift values $SHIFT_a$, $SHIFT_b$, $SHIFT_c$. In the second embodiment, the most appropriate frequency shift value is $SHIFT_b$. Finally, the processing unit 111 of the mobile apparatus 11 calculates the moving speed $V_1$ according to the most appropriate frequency shift value $SHIFT_b$ and the reference frequency value $F_{ref}$ by using the Doppler Effect.

Further speaking, according to the Doppler Effect Formula $$f' = \left(\frac{v \pm v_1}{v \mp v_s}\right)f,$$

the frequency value $f_b$ corresponding to the most appropriate frequency shift value $SHIFT_b$ is substituted into f', the light speed (i.e., the traveling speed of electromagnetic waves in a medium) is substituted into v, the moving speed (i.e., zero) of the second base station 15b is substituted into $V_s$, and the baseline frequency value is substituted into f to calculate the moving speed $V_1$ of the mobile apparatus 11.

It should be particularly appreciated that, in the second embodiment, a preferred implementation of the reference frequency value $F_{ref}$ may be an average frequency value of the frequency values $f_a$, $f_b$, $f_c$, and a preferred implementation of the most appropriate frequency shift value may be the greatest frequency shift value of the frequency shift values $SHIFT_a$, $SHIFT_b$, $SHIFT_c$. However, this is not intended to limit the implementations of the reference frequency value and the most appropriate frequency shift value of the present invention.

Additionally, the closer to 0° (or 180°) the angle included between the moving direction of the mobile apparatus and the base station is, the more towards (or far away from) the base station the moving direction of the mobile apparatus will be and, thus, the greater the frequency shift value between the mobile apparatus and the base station will be, and this is favorable for the accuracy of calculating a speed by using the Doppler Effect. Therefore, the method of present invention described above is mainly to select, among a plurality of base stations, the frequency of the base station having the greatest frequency shift value relative to the average frequency as the basis of calculating the Doppler Effect so as to improve the accuracy of the mobile apparatus speed calculation.

Figure 3:
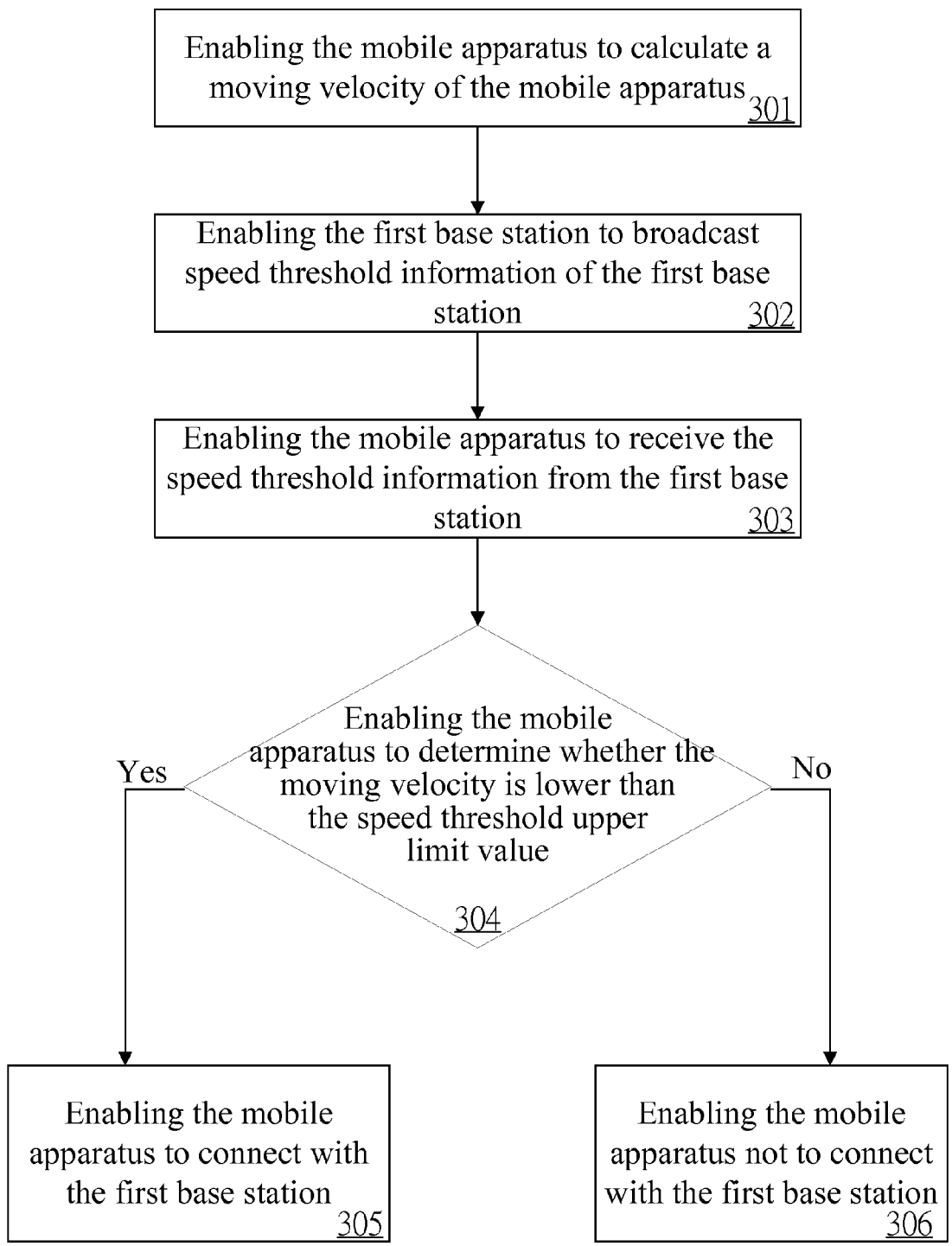
FIG. 3 is a flowchart diagram of a base station connecting method according to a third embodiment of the present invention.

A third embodiment of the present invention is a base station connecting method, a flowchart diagram of which is shown in FIG. 3. The method of the third embodiment is for use in a wireless network system (e.g., the wireless network system 1 of the embodiments described above). The wireless network system comprises a mobile apparatus and a first base station. Steps of the third embodiment are detailed as follows.

Firstly, step 301 is executed to enable the mobile apparatus to calculate a moving speed of the mobile apparatus. Step 302 is executed to enable the first base station to broadcast speed threshold information of the first base station. The speed threshold information comprises a speed threshold upper limit value. Step 303 is executed to enable the mobile apparatus to receive speed threshold information from the first base station. Then, step 304 is executed to enable the mobile apparatus to determine whether the moving speed is lower than the speed threshold upper limit value.

If the determination result is "yes", step 305 is executed to enable the mobile apparatus to connect with the first base station. If the determination result is "no", step 306 is executed to enable the mobile apparatus to determine not to connect with the first base station. Likewise, in other implementations, the speed threshold information may further comprise a speed threshold lower limit value, which represents a speed lower limit of the mobile apparatus that can be served by the first base station; and the mobile apparatus also can simultaneously determine whether the moving speed is between the speed threshold lower limit value and the speed threshold upper limit value so as to subsequently determine whether to connect with the first base station.

Figure 4:
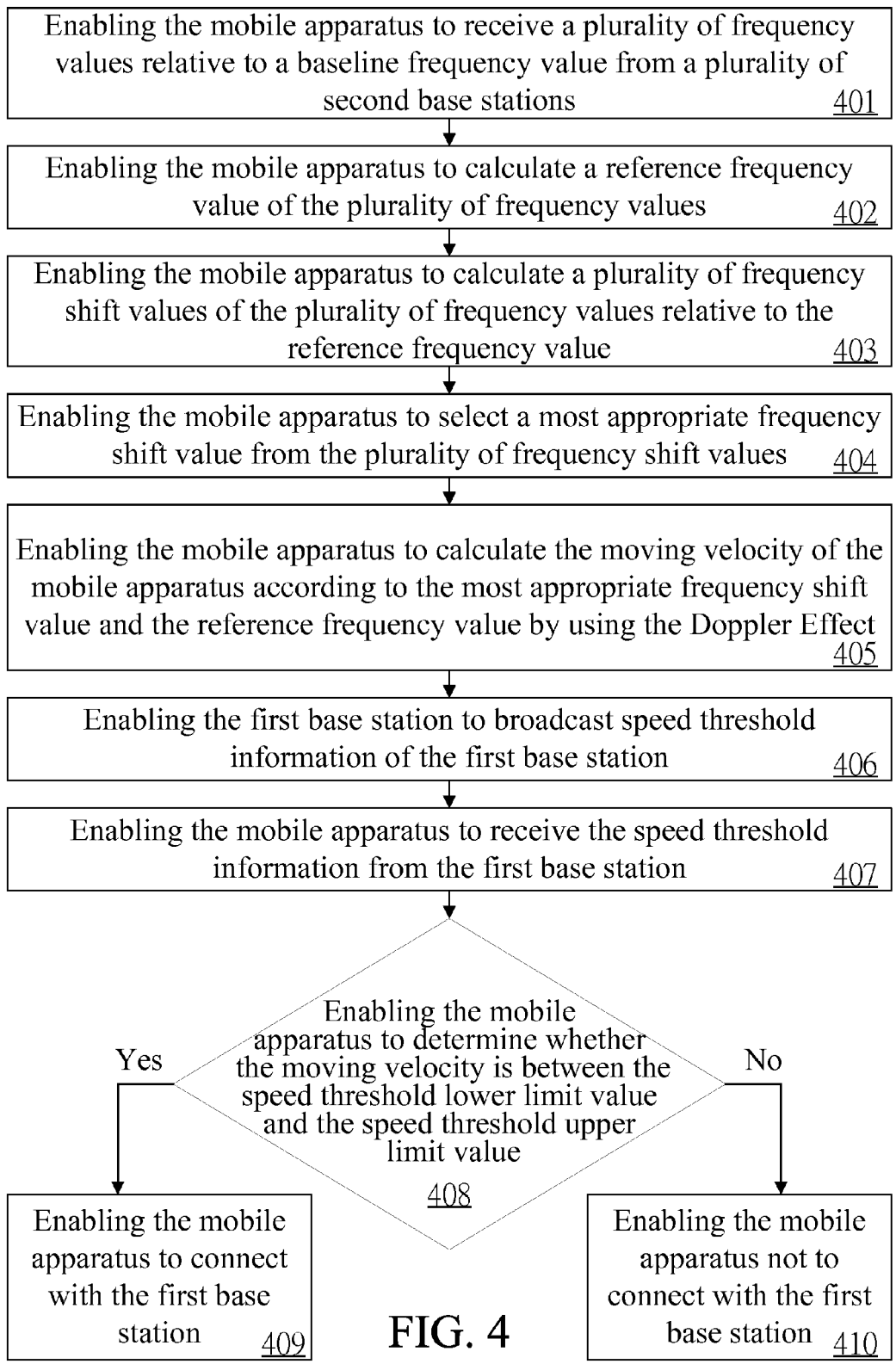
FIG. 4 is a flowchart diagram of a base station connecting method according to a fourth embodiment of the present invention.

A fourth embodiment of the present invention is a base station connecting method, a flowchart diagram of which is shown in FIG. 4. The method of the fourth embodiment is for use in a wireless network system (e.g., the wireless network system 1 of the embodiments described above). The wireless network system comprises a mobile apparatus and a first base station. Steps of the fourth embodiment are detailed as follows.

Firstly, step 401 is executed to enable the mobile apparatus to receive a plurality of frequency values relative to a baseline frequency value from a plurality of second base stations. Step 402 is executed to enable the mobile apparatus to calculate a reference frequency value of the frequency values. Step 403 is executed to enable the mobile apparatus to calculate a plurality of frequency shift values of the plurality of frequency values relative to the reference frequency value. Step 404 is executed to enable the mobile apparatus to select a most appropriate frequency shift value from the plurality of frequency shift values.

Then, step 405 is executed to enable the mobile apparatus to calculate a moving speed of the mobile apparatus according to the most appropriate frequency shift value and the reference frequency value by using the Doppler Effect. After the moving speed of the mobile apparatus is calculated, step 406 is executed to enable the first base station to broadcast speed threshold information of the first base station. The speed threshold information comprises a speed threshold upper limit value and a speed threshold lower limit value. Next, step 407 is executed to enable the mobile apparatus to receive the speed threshold information from the first base station.

Then, step 408 is executed to enable the mobile apparatus to determine whether the moving speed is between the speed threshold lower limit value and the speed threshold upper limit value. If the determination result is "yes", step 409 is executed to enable the mobile apparatus to connect with the first base station; and otherwise, if the determination result is "no", step 410 is executed to enable the mobile apparatus not to connect with the first base station.

According to the above descriptions, the wireless network system and the base station connecting method thereof of the present invention can calculate the moving speed of the mobile apparatus accurately by use of frequency signals of a plurality of base stations without the need of disposing GPS hardware in the mobile apparatus, and further determine by the mobile apparatus itself whether there is a need to connect with one of the base stations according to the acceptable speed service range information broadcasted by the base stations. Thereby, the mobile apparatus can connect to an appropriate base station more stably and efficiently, thus solving the problems with the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station connecting method for a mobile apparatus, the mobile apparatus comprising a transceiver and a processing unit, and the base station connecting method comprising:
   (a1) the transceiver of the mobile apparatus receiving a plurality of frequency values relative to a baseline frequency value from a plurality of second base stations;
   (a2) the processing unit of the mobile apparatus calculating a reference frequency value of the frequency values;
   (a3) the processing unit of the mobile apparatus calculating a plurality of frequency shift values of the frequency values relative to the reference frequency value;
   (a4) the processing unit of the mobile apparatus selecting a most appropriate frequency shift value from the frequency shift values;
   (a5) the processing unit of the mobile apparatus calculating a moving speed of the mobile apparatus according to the most appropriate frequency shift value and the reference frequency value by using the Doppler Effect formula;
   (b) the transceiver of the mobile apparatus receiving speed threshold information from a first base station, wherein the speed threshold information comprises a speed threshold upper limit value;
   (c) the processing unit of the mobile apparatus determining that the moving speed is lower than the speed threshold upper limit value; and
   (d) the processing unit of the mobile apparatus connecting with the first base station via the transceiver according to the result of the step (c).

2. The base station connecting method of claim 1, wherein the speed threshold information further comprises a speed threshold lower limit value, and the step (c) further comprising:
   (c1) the processing unit of the mobile apparatus determining that the moving speed is between the speed threshold upper limit value and the speed threshold lower limit value.

3. The base station connecting method of claim 1, wherein the reference frequency value is an average frequency value of the frequency values.

4. The base station connecting method of claim 1, wherein the most appropriate frequency shift value is the greatest frequency shift value of the frequency shift values.

5. A base station connecting method for a wireless network system, the wireless network system comprising a mobile apparatus and a first base station, the mobile apparatus comprising a transceiver and a processing unit, and the base station connecting method comprising:
- (a1) the transceiver of the mobile apparatus receiving a plurality of frequency values relative to a baseline frequency value from a plurality of second base stations;
- (a2) the processing unit of the mobile apparatus calculating a reference frequency value of the frequency values;
- (a3) the processing unit of the mobile apparatus calculating a plurality of frequency shift values of the frequency values relative to the reference frequency value;
- (a4) the processing unit of the mobile apparatus selecting a most appropriate frequency shift value from the frequency shift values;
- (a5) the processing unit of the mobile apparatus calculating a moving speed of the mobile apparatus according to the most appropriate frequency shift value and the reference frequency value by using the Doppler Effect formula;
- (b) the first base station broadcasting speed threshold information of the first base station, wherein the speed threshold information comprises a speed threshold upper limit value;
- (c) the transceiver of the mobile apparatus receiving the speed threshold information from the first base station;
- (d) the processing unit of the mobile apparatus determining that the moving speed is lower than the speed threshold upper limit value; and
- (e) the processing unit of the mobile apparatus connecting with the first base station via the transceiver according to the result of the step (d).

6. The base station connecting method of claim 5, wherein the speed threshold information further comprises a speed threshold lower limit value, and the step (d) further comprising:
- (d1) the processing unit of the mobile apparatus determining that the moving speed is between the speed threshold upper limit value and the speed threshold lower limit value.

7. The base station connecting method of claim 5, wherein the reference frequency value is an average frequency value of the frequency values.

8. The base station connecting method of claim 5, wherein the most appropriate frequency shift value is the greatest frequency shift value of the frequency shift values.

9. A wireless network system, comprising:
- a mobile apparatus comprising a transceiver and a processing unit; and
- a first base station;
- wherein the transceiver of the mobile apparatus receives a plurality of frequency values relative to a baseline frequency value from a plurality of second base stations, the processing unit calculates a reference frequency value of the frequency values, calculates a plurality of frequency shift values of the frequency values relative to the reference frequency value, selects a most appropriate frequency shift value from the frequency shift values, and calculates a moving speed of the mobile apparatus according to the most appropriate frequency shift value and the reference frequency value by using the Doppler Effect formula, the first base station broadcasts speed threshold information of the first base station, the speed threshold information comprises a speed threshold upper limit value, the transceiver of the mobile apparatus receives the speed threshold information from the first base station, and the processing unit connects with the first base station via the transceiver after determining that the moving speed is lower than the speed threshold upper limit value.

10. The wireless network system of claim 9, wherein the speed threshold information further comprises a speed threshold lower limit value, and the processing unit of the mobile apparatus further connects with the first base station via the transceiver after determining that the moving speed is between the speed threshold upper limit value and the speed threshold lower limit value.

11. The wireless network system of claim 9, wherein the reference frequency value is an average frequency value of the frequency values.

12. The wireless network system of claim 9, wherein the most appropriate frequency shift value is the greatest frequency shift value of the frequency shift values.

* * * * *